FIG. 2

INVENTOR
C. B. H. FELDMAN
BY a.j. Zerbarini
ATTORNEY

April 22, 1947.  C. B. H. FELDMAN  2,419,205
DIRECTIVE ANTENNA SYSTEM
Filed Nov. 4, 1942  6 Sheets-Sheet 3

FIG. 4

CLASS B PATTERN

FIG. 5

CLASS A PATTERN

INVENTOR
C.B.H. FELDMAN
BY A. J. Zerbarini
ATTORNEY

April 22, 1947.   C. B. H. FELDMAN   2,419,205
DIRECTIVE ANTENNA SYSTEM
Filed Nov. 4, 1942   6 Sheets-Sheet 5

FIG. 9

THEORETICAL RESULTANT - HORIZONTAL PLANE CHARACTERISTIC

FIG. 10

MEASURED RESULTANT - HORIZONTAL PLANE CHARACTERISTIC

INVENTOR
C. B. H. FELDMAN
BY A. J. Zerbarini
ATTORNEY

Patented Apr. 22, 1947

2,419,205

UNITED STATES PATENT OFFICE 2,419,205

DIRECTIVE ANTENNA SYSTEM

Carl B. H. Feldman, Rumson, N. J., assignor to Bell Telephone Laboratories, Incorporated, New York, N. Y., a corporation of New York Application November 4, 1942, Serial No. 464,479

16 Claims. (Cl. 250—11)

1

This invention relates to radio scanning or radar systems and more particularly to microwave or centimetric direction finding antennas for such systems.

As is known and as is disclosed in Patent 2,231,929, J. Lyman, February 18, 1941, and the copending application of N. W. Bryant, Serial No. 423,757, filed December 20, 1941, it has been proposed to radio-scan a given territorial sector or area by mechanically spinning a parabolic reflector system and thus causing the directive characteristic to sweep over the sector. In these systems the waves emitted at the radio scanner, and returned thereto by reflective objects, are supplied to a cathode ray tube indicator for the purpose of producing a visual indication of the azimuthal direction and distance to the remote object. In addition, as disclosed in British Patent 526,658, dated September 23, 1940, it has been suggested to utilize four directive arrays having a common reflector and aligned with the north, south, east and west directions for causing a scanning lobe to assume, successively, the four cardinal compass point directions and, in this sense, to sweep electrically through 360 degrees over the territory to be viewed or scanned. Also, as disclosed in the copending application of L. Espenschied, Serial No. 413,587, filed October 4, 1941, a pipe antenna or array comprising unit antenna apertures spaced along a tubular wave guide has been suggested for obtaining a rapid scanning action. In this last-mentioned system the frequency of the emitted waves is wobbled at a high speed to secure a varying phase relation of the emitted and received aperture energies, whereby rapid electrical steering or sweeping of the space factor characteristic of the pipe array is secured.

While, in general, the systems disclosed in the above copending applications and patents appear to be satisfactory for particular scanning operations, it has been definitely established that optimum scanning action is not always obtained with these systems, primarily because of certain defects and disadvantages inherent therein and which it is now desired to avoid. Thus, the directive characteristic of the antennas used in most of the above-mentioned systems includes not only a principal lobe but also pronounced subsidiary lobes whereby ambiguous scanning obtains. To illustrate, if a subsidiary lobe is comparable in strength to the principal lobe, waves are projected simultaneously in angularly related directions by the radar or scanner and, assuming the waves emitted in one direction and corresponding to either the principal or subsidiary lobe, are reflected back to the scanner by a target, there is obtained on the cathode ray tube screen a single indication which is subject to two interpretations as to direction, and the true direction to the object is therefore unascertainable. Again, the principal lobe of the receiving antenna in certain of the above-mentioned systems is altogether too wide, as for example, 90 degrees in the case of the system of the aforesaid British patent, whereby a high degree of resolution in the pictorial representation produced on the tube screen is not realized. Also, in certain of the above systems the "directivity gain," considered in the direction of maximum antenna action, is not sufficient, although the directive characteristic may be satisfactory, to scan accurately an area or sector located at a long range, say 50 miles from the scanning point. If the gain is low the antenna action is insufficient to transmit satisfactorily and receive satisfactorily, via reflection, waves over a normal linear round trip path.

It is one object of this invention to scan, by radio, a given area or territorial sector at an exceedingly rapid rate.

It is another object of this invention to scan an area without ambiguity.

It is another object of this invention to secure a radio beam having at the half power point an extremely narrow width.

It is another object of this invention to scan by radio, accurately and with a high degree of resolution, areas located at a considerable distance, that is, at a long range, from the scanner.

It is another object of this invention to obtain, in a radio scanning system, a higher degree of resolution than heretofore secured.

It is another object of this invention to determine with a high degree of accuracy the difference in bearing and range, relative to the scanning antenna location, of two remotely located objects, as for example, an enemy warship and the transitory splash of an exploding shell in the vicinity thereof.

It is another object of this invention to distinguish, in a radio scanning system, objects or targets located at the same distance or range from the scanner.

It is another object of this invention to secure a radio scanning antenna having an exceedingly high gain in all scanning directions.

It is another object of this invention to obtain a high gain, highly directive, electrically steerable scanning antenna of compact construction suitable for installation on mobile craft.

It is still another object of this invention to obtain a multiple unit steerable antenna array having a substantially uniform action for all directions included in the scanning sector.

It is a further object of this invention to obtain, in a multiple unit steerable antenna, a moving or sweeping resultant principal lobe, that is, a combined space factor and unit antenna lobe, the intensity of which remains substantially constant during the sweep.

As used herein, the terms "antenna currents," "unit currents," and "trident currents" refer to the energies originating at the transmitter and delivered, after modification by the phase shifters, to the tridents, and to the energies received by the tridents and supplied, after modification by the phase shifters, to the receiver in device 3. Also, as used herein, the terms "directivity" and "directive characteristic" denote the ability of an antenna element, unit or array to transmit or receive in a certain direction or directions in a given plane, as compared to its ability or action in the remaining directions in the aforementioned plane. In fine, these terms refer to the antenna's ability to discriminate as to direction regardless of its performance or gain as compared to another antenna. The term "gain" denotes the action or performance of the antenna, in a given plane and in the particular direction in said plane of maximum antenna action, as compared to the action in any direction of a standard reference antenna having a non-directional characteristic in said plane. To illustrate, an iron wire quarter wave vertical antenna and a copper wire quarter wave vertical antenna have in general the same directive characteristic but different gains, in view of their different ohmic losses. The gain and directivity are related in the sense that an antenna having a gain greater than the standard antenna must necessarily be directive to some degree. Conceivably, if the heat losses are sufficient, a highly directive antenna may have a negative gain as compared to the standard non-directional antenna.

In accordance with one embodiment of the invention, fourteen unit antennas each comprising three parallel end-on unidirectional dielectric antenna elements arranged in a broadside or stack array and forming a trident unit are utilized. The horizontal spacing between the tridents or unit antennas is approximately 2 wave-lengths, as measured in air, and the vertical spacing between the adjacent elements in each trident is about 2.7 wave-lengths measured in air. Assuming the mean operating wave length is 9.80 centimeters, the over-all length of the array is slightly greater than 26 wave lengths, that is, 8.5 feet. The broadside array of fourteen tridents is divided into two subarrays of seven tridents, the alternate tridents being included in the same subarray. The two subarrays constitute in effect separate multiunit steerable subarrays connected in parallel, and each subarray includes a set or tray of six adjustable wave guide phase shifters spaced along a branch of subarray wave guide. Considering each half of each subarray the phase shifters are connected in tandem. As discussed below, the shifters function to obtain a uniformly progressive phase relation or distribution for the trident currents. The branch guides are connected, each at its mid-point, to different extremities of an auxiliary wave guide which includes an adjustable wave guide phase shifter; and each branch guide is directly connected at its mid-point to the central antenna of its subarray. A trident feeder or guide is included between each trident and its subarray guide, and the orifices at the junctions of the trident guide and subarray guide are proportioned to obtain a stepped triangular or stile-like amplitude distribution for the fourteen trident currents.

A transceiver including a pulse type transmitter-receiver, an adjustable delay or timing circuit, and a cathode ray tube indicator, is connected by means of a coaxial line or main wave guide to the center point of the auxiliary wave guide channel. Also, equalizing wave guide loops are included between the branch guides and the intermediate tridents in each subarray, so that the fourteen paths or dielectric channels extending from the transceiver through the phase shifters to the fourteen tridents are substantially equal in electrical length and have equal delays. Switching means are provided for obtaining either a radar class A or a radar class B indication on the tube screen. A motor is provided for simultaneously and continuously rotating the twelve rotors of the phase shifters in the two trays at a constant speed and for rotating the rotor of the auxiliary phase shifter at one-half the aforesaid speed. For the class A indication, the twelve rotors rotate very slowly, for example, one revolution per minute, and for the class B indication they rotate very rapidly, for example, several hundred revolutions per minute. The equalizing loops, the wave guides, the wave guide phase shifters, the motor and associated drive shafts, are included in a compact metallic housing, the front wall of which supports the polyrods. The housing is gyroscopically supported on the top of the gun director tower of a battleship. In addition, the housing may be rotated in a horizontal plane and tilted in a vertical plane perpendicular to the longitudinal axis of the array.

In operation, pulsed centimetric waves are emitted by the scanning system successively in contiguous clusters of angularly related directions included in a predetermined azimuthal territorial sector, as for example a 30-degree sector; and the particular pulses returned to the scanning system by reflective targets or objects such as airplanes, buildings, ground contours, river and ocean shore lines, etc., are supplied to the cathode ray tube indicator. A trace is produced on the tube screen which indicates the azimuthal direction, and the distance or range of the various reflective objects, and therefore affords a luminous pictorial representation of the areal territorial sector being scanned. More specifically, the continuously rotating phase shifters function to vary, continuously and cyclically, the uniformly progressive phase relation or distribution of the trident currents and thus cause the primary lobe of the space factor characteristic to sweep across the maximum lobe of the trident characteristic. Hence, the principal lobe of the over-all or resultant directive characteristic of the system, which principal lobe is equal to the product of the space factor primary lobe and the trident maximum lobe, sweeps across the 30-degree scanning sector. The sweep or scanning rate is approximately 600 sweeps per minute. By reason of the critically selected trident spacing, the angular spacing between the primary and secondary space factor lobes is substantially the same as the angular width of the desired scanning sector. Also, partly by reason of the spacing between the aforementioned space factor lobes and partly by reason of the width and shape of the central or effective portion of the maximum trident lobe, a completely unambiguous indication is obtained for the central 20-degree scanning zone of the 30-degree sector, the indication obtained in the 5-degree end sectoral zones being slightly ambiguous. By virtue in part of the length and number of antenna units, the resultant lobe for the system is extremely narrow as, for example, 2 degrees at the lobe half power point, whereby an exceedingly high degree of resolution in the pictorial representation is obtained. Since the nose or tip of the maximum lobe of the trident is relatively blunt, the intensity of the principal resultant lobe does not vary materially during the sweep. In addition, inasmuch as the gain of each polyrod over a standard reference microwave antenna is relatively high and the combined gain of the three polyrods constituting the basic trident unit is still higher, the over-all gain of the radar antenna taken in the direction perpendicular to the broadside array is exceedingly high so that accurate long range scanning is obtained.

The invention will be more fully understood from a perusal of the following specification taken in conjunction with the drawing on which like reference characters denote elements of similar function, and on which.

*Description of structure*

Figures 1, 3:
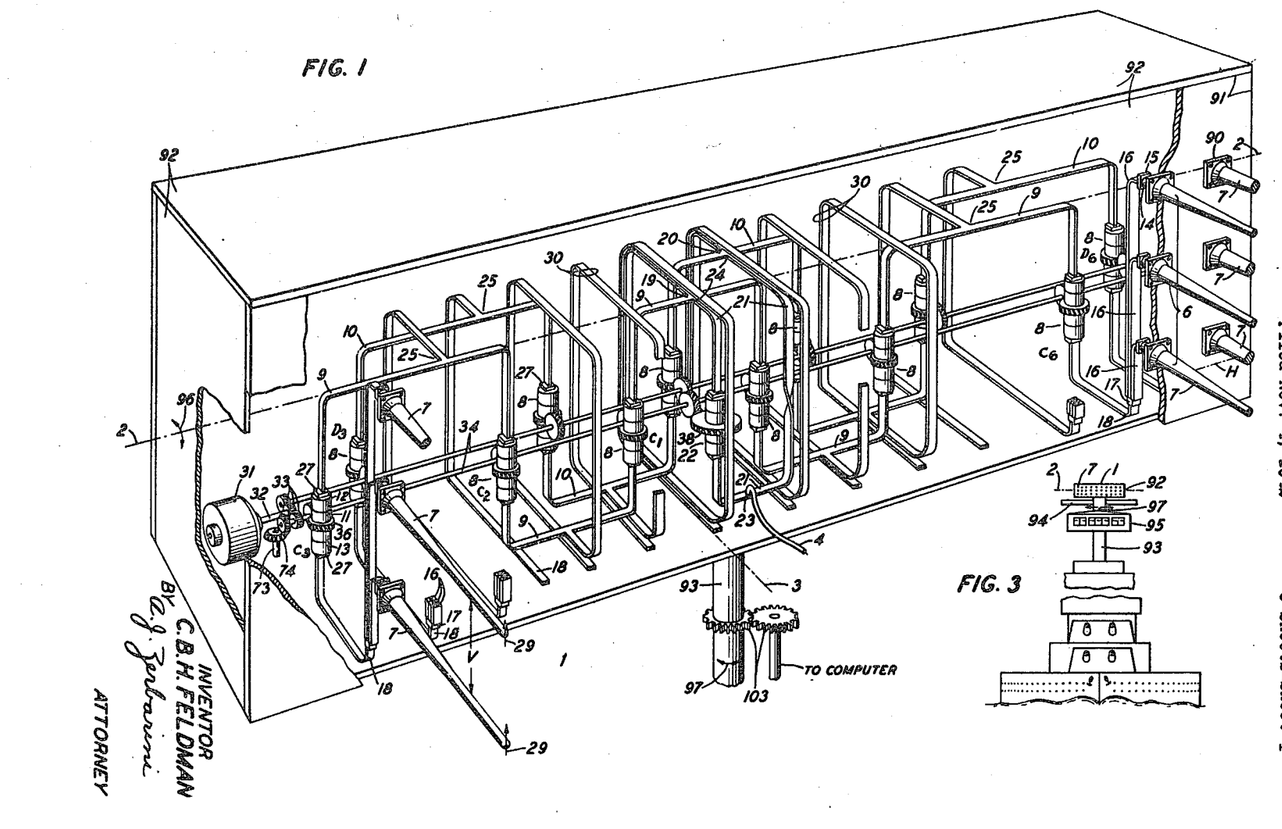
Fig. 1 is a mechanical schematic illustration and Fig. 2 is an electrical schematic illustration of one embodiment of the invention.
Fig. 3 is a fragmentary view showing a battleship equipped with the radar illustrated by Figs. 1 and 2.
Figure 2:
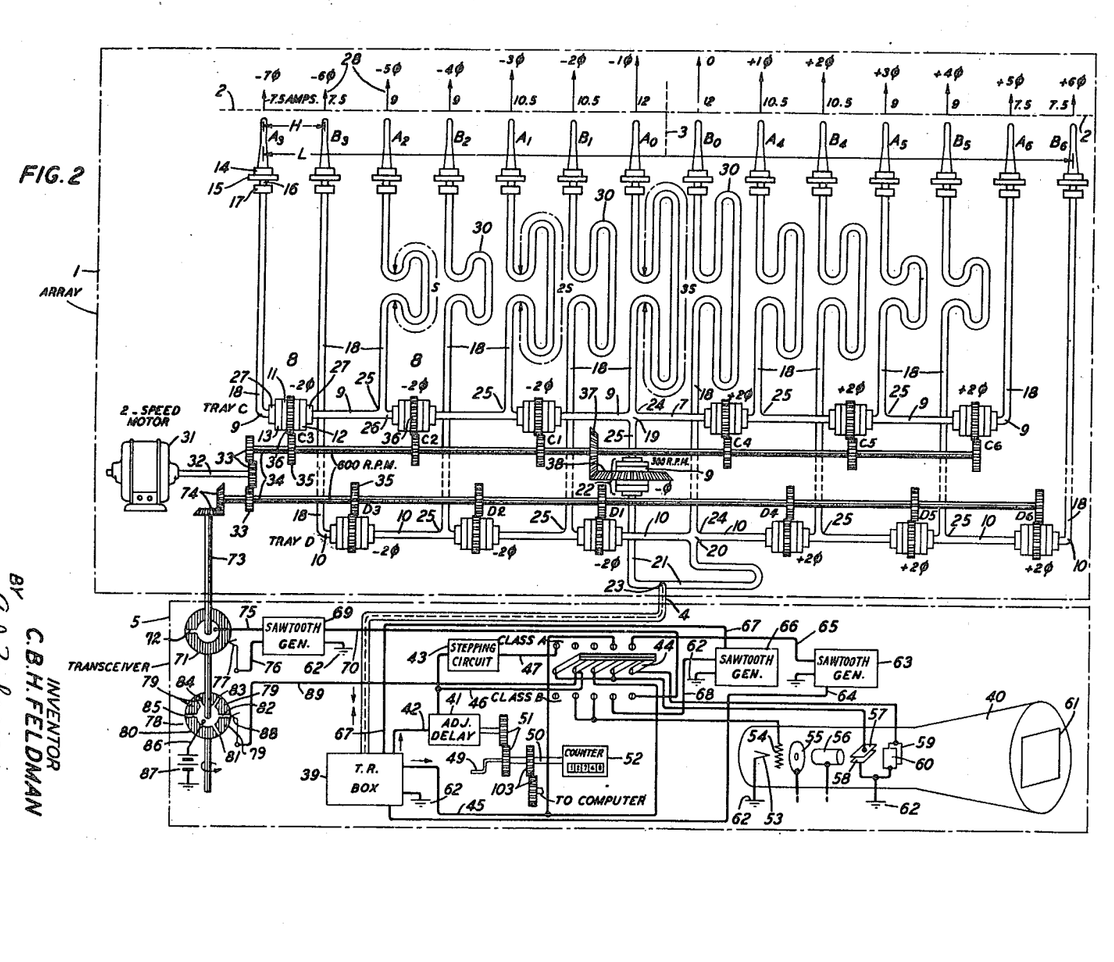

Referring to Figs. 1, 2 and 3, reference numeral 1 designates a multiple unit steerable antenna array or system having a longitudinal axis 2 and a transverse axis 3, array 1 being connected by means of coaxial line 4 to a transceiver 5. The array 1 comprises fourteen antenna units or tridents 6 horizontally spaced along axis 2. Each trident comprises three vertically spaced dielectric antenna elements 7. The horizontal spacing "H" of the adjacent units is 2 wave-lengths measured in air at 9.8 centimeters; and the vertical spacing "V" of the elements 7 is 2.7 wave-lengths in air, corresponding to 2.00 wave-lengths in the wave guide. The dielectric antenna elements 7 are composed of polystyrene and in this respect resemble those illustrated in Figs. 37–39 of Patent 2,405,242 issued on August 6, 1946, to G. C. Southworth. In addition, the elements or polyrods 7 are circular and have a non-uniform phase velocity. This type of polyrod is claimed in the application of G. E. Mueller, Serial No. 469,284, filed December 17, 1942.

Referring particularly to Fig. 2, array 1 is divided into two subarrays, A and B, the seven alternate tridents 6 designated $A_3$, $A_2$, $A_1$, $A_0$, $A_4$, $A_5$ and $A_6$, constituting the subarray A, and the seven alternate tridents $B_3$, $B_2$, $B_1$, $B_0$, $B_4$, $B_5$ and $B_6$ constituting subarray B. Subarray A includes a set or tray C of six adjustable wave guide phase shifters 8 denoted, left to right, $C_3$, $C_2$, $C_1$, $C_4$, $C_5$, and $C_6$, and a branch or subarray rectangular wave guide channel 9; and subarray B includes a set or tray D of adjustable phase shifters 8 denoted $D_3$, $D_2$, $D_1$, $D_4$, $D_5$, and $D_6$ and the rectangular branch wave guide channel 10. The phase shifters are of the type claimed in the application of A. G. Fox, Serial No. 464,333, filed November 3, 1942, the shifters being preferably modified for wide band operation. The modified or wide band shifter is claimed in the application of D. H. Ring, Serial No. 469,897, filed December 23, 1942. Each phase shifter 8 comprises a central rotatable section or rotor 11 and two end stationary sections 12 and 13, one of which is a polarizer or circularizer for converting a wave having a fixed linear polarization to one having a circular or rotating linear polarization, and the other of which is a depolarizer or decircularizer for converting a circularly polarized wave to one having a fixed linear polarization, the identical end sections functioning as polarizers or depolarizers depending upon the direction of wave propagation in the phase shifter and, therefore, upon whether the array is transmitting or receiving high frequency pulses. In more detail, in the case of each unit or trident 6, the three tapered polyrods 7 are each connected through an individual short circular air-filled wave guide or coupling section 14 included in the polyrod mounting and through a separate polyrod impedance matching transformer 15 to a single rectangular polyrod wave guide 16. The three polyrod guides or channels 16 are connected through a combined trident transformer and load distributor 17 to a rectangular trident wave guide 18. Considering subarray A, the seven trident wave guides 18 are connected to the associated subarray guide 9, the central trident $A_0$ being connected directly; the tridents $A_1$ and $A_4$ each through only one of shifters $C_1$ and $C_4$ respectively; the tridents $A_2$ and $A_5$ each through two phase shifters, namely, shifter $C_2$ in tandem with shifter $C_1$ and shifter $C_4$ in tandem with $C_5$, respectively; and the tridents $A_3$ and $A_6$ each through three phase shifters, namely shifter $C_3$ in tandem with shifters $C_2$ and $C_1$ and shifter $C_6$ in tandem with shifters $C_5$ and $C_4$ respectively, to the mid-point 19 of subarray guide 9. Similarly, in subarray B the central trident $B_0$ is connected directly, the adjacent tridents $B_1$ and $B_4$ each through a single phase shifter, the next adjacent tridents $B_2$ and $B_5$ each through two tandem phase shifters, and the remaining or end tridents $B_3$ and $B_6$ each through three tandem phase shifters, to mid-point 20 of subarray guide 10.

Reference numeral 21 denotes a rectangular auxiliary wave guide which extends between the mid-points 19 and 20 of subarray guides 9 and 10 and includes an auxiliary rotatable wave guide phase shifter 22 of the type previously mentioned. The coaxial line 4 is connected to the mid-point 23 of the auxiliary guide 21, the coupling at the junction being of the multifrequency impedance matching type. Hence the array constitutes two distinct multiple unit subarrays A and B connected in parallel, each of the subarrays, and the array 1 considered as a whole, being of the broadside, tandem phase shifter type and each of the tridents in each subarray, except one, being interposed between adjacent tridents of the other subarray. The lobe sweeping, multiple unit radar antenna of the invention should be sharply distinguished from the signal (telephone or telegraph) multiple unit steerable array (MUSA) of the end-on parallel phase shifter type disclosed in Patent 2,041,600, dated May 19, 1936, H. T. Friis and from the signal multiple unit steerable array of the broadside, parallel phase shifter type disclosed in Patent 2,245,660 granted on June 17, 1941, to H. T. Friis and the applicant. In a sense, the antenna of the invention is a free space system since a ground image antenna is not utilized and the earth does not obliterate any portion of the space factor characteristic; whereas, the signal MUSAS mentioned above are not free space systems, since the image MUSA constitutes a portion of the entire system and the ground affects both the unit antenna and space factor characteristics, one-half the space characteristic being completely canceled in the case of the end-on signal MUSA. The subarrays A and B are distinct in the sense that each may, if desired, be used independently to secure a given result; and they are dependent or intermingled in the sense that when used together the space factor resultant secured is different from that obtained when either is used alone or that obtained when both are used simultaneously, but independently, as when the seven A tridents and the seven B tridents are not alternately arranged on a single line but are removed a distance from each other for the purpose of securing separate space factor effects.

Each of the trident guides 18 associated with the two central tridents $A_0$ and $B_0$ is connected to its subarray guide 9 or 10, and to an auxiliary guide 21, through an X wave guide guide junction 24. Each of the trident guides 18 for the intermediate tridents $A_1$, $A_4$, $A_2$, $A_5$ and $B_1$, $B_4$, $B_2$, $B_5$ is connected to its subarray guide 9 or 10 through a T wave guide junction 25; and each of the trident guides 18 for the end trident $A_3$, $A_6$ and $B_3$, $B_6$ is directly connected to its subarray guide 9 or 10. Near each X and T connection, one or more shunt impedances, such as the linear plunger 26, are provided so that, looking from the adjacent phase changer toward the polyrods the input impedance of the T connection 25 is matched to the phase changer guides 9 or 10. At each end of each of the phase shifters 8 and 22, a transformer 27 is provided for matching the impedances of the circular wave guide forming the phase shifters to the adjacent rectangular sections of the subarray guides 9 and 10 and auxiliary wave guide 21, respectively. Also, as indicated by arrows 29, Fig. 1, the waves transferred between line 4 and guide 21 and established in polyrods 7 are vertically polarized, the waves utilized being of the $H_{11}$ type. By proper design of the wave guide apertures or orifices at the X and T junctions, the intensities of the waves supplied to the intermediate tridents and therefore to all tridents in each subarray, are adjusted or controlled to secure a stepped triangular or stile-like power distribution for the entire array, as shown by the arrows 28 of different lengths. Thus, in each subarray the trident amplitudes decrease uniformly in both directions, left and right, from the central trident, the amplitude of the current in the central trident being the largest, the amplitudes of the end trident currents being the smallest, and the two subarrays A and B having the same triangular amplitude distribution. Specifically, the amplitudes of the currents in tridents $A_3$, $B_3$, $A_2$, $B_2$, $A_1$, $B_1$, $A_0$, $B_0$, $A_4$, $B_4$, $A_5$, $B_5$, $A_6$ and $B_6$ are preferably 7.5, 7.5, 9, 9, 10.5, 10.5, 12, 12, 10.5, 10.5, 9, 9 7.5 and 7.5 respectively.

While preferably the operating wave-length is maintained constant at the selected value, for example, 9.80 centimeters, the wave guide system and the polyrods are designed for efficient operation over a fairly broad band of microwave wave-lengths, namely 9.70 to 9.90 centimeters. Accordingly, the phase shifters are, as already stated, preferably modified for wide band operation in accordance with the disclosure of the above-mentioned application to D. H. Ring and the polyrods are critically tapered for wide band operation in accordance with the aforementioned application of G. E. Muller. Moreover, in order to secure proper operation over the operating wave-length band, loops 30 are provided in two of the three trident guides 18 extending from the mid-point 19 or 20 to the three tridents in each half of each subarray A or B, for equalizing the "delays" in the three above-mentioned trident guides 18, and consequently for equalizing the delays for all fourteen trident guides 18. As explained in Patent 2,225,928, D. H. Ring, December 24, 1940, the "delay" of a path is the rate of phase change with frequency change; and the delay for two paths may be equalized by equalizing their line lengths. Considering the three tridents in each half of each subarray, the difference "S" in electrical length for the paths to two adjacent tridents is more or less proportional to the physical spacing between the tridents and the additional effective electrical length introduced by the interposed phase shifter 8 and associated two transformers 17. Hence, considering the entire array 1, the equalizing loops 30 associated with the central tridents $A_0$ and $B_0$ each have an electrical length of approximately 3S, the loops 30 connected to the next adjacent tridents $A_1$, $A_4$, $B_1$, $B_4$ an electrical length of approximately 2S, and the loops connected to the remaining tridents $A_2$, $A_5$, $B_2$, $B_5$ an electrical length of approximately S. Since the line 4 is connected to the mid-point 23 of auxiliary guide 21, the transceiver 5 is connected to the fourteen tridents by dielectric paths of approximately equal lengths and equal delays.

Reference numeral 31 denotes a high and low speed motor connected by a main shaft 32 and the three equal size gears 33 to the two tray shafts 34, each shaft having equal size gears 35 mounted thereon for driving the gears 36, each of which is integral with a rotor 11 of the phase shifters 8. The ratio of gears 35 and 36 is 1 to 1 so that, in operation, the rotors of phase shifters 8 in the two subarrays are continuously and simultaneously rotated at the constant motor speed. Reference numeral 37 denotes a gear mounted on one of shafts 34 and connected to gear 38 associated with the rotor 11 of the auxiliary phase shifter 22, the gear ratio for gears 37 and 38 being 1 to 2, whereby the rotor 11 of phase shifter 22 is driven at one-half of the speed of the rotors of phase shifters 8. In one particular embodiment with the motor 31 at high speed for the class B pattern, the motor and the rotors of shifters 8 rotate at about 600 revolutions per minute, and the rotor of phase shifter 22 at about 300 revolutions per minute. With the motor at slow speed, for the class A indication, the rotation speeds of the tandem phase shifters and the auxiliary phase shifter 22 are, respectively, one revolution per minute and one-half revolution per minute.

The transceiver 5 comprises a conventional transmitter receiver device or TR box 39 connected to line 4 for supplying to and receiving from array 1 pulsed centimetric waves, a cathode ray tube indicator 40 and an adjustable liquid delay 41 of the type disclosed in the copending application of S. Schockley and G. W. Willard, Serial No. 439,396, filed April 17, 1942, the delay device 41 being connected by the reference pulse lead 42 to the transmitter in device 39. Transceiver 5 also includes a stepping circuit 43 connected to delay device 41, a double throw five-pole switch 44 which is connected to the tube indicator 40 by several leads and to the receiver in device 39 by the received echo pulse lead 45. Tube 40 is connected to delay device 41 through switch 44 and the branch reference pulse lead 46, for the class B indication and, alternatively, through switch 44 and branch reference pulse lead 47 for the class A indication, the stepping circuit 43 being included in the branch lead 47 and used only with the class A indication. The adjustment of delay circuit 41 may be made manually by means of handle 49 associated with shaft 50 and gears 51. A counter 52 is mounted on the shaft 50 for ascertaining the range in yards. The tube indicator 40 comprises the cathode 53, grid 54, anode 55, focusing electrode 56, horizontal plates 57 and 58, vertical plates 59 and 60, a rectangular screen 61, the plates 58 and 60 being connected to the ground 62. As previously indicated and as explained in detail below, the class B (Fig. 4) and the class A (Fig. 5) pattern may be obtained alternatively on the screen 61 of tube indicator 40 by proper manipulation of switch 44.

Reference numeral 63 denotes a saw-tooth generator controlled by the transmitter in device 39 over lead 64 and arranged to be connected through lead 65 and switch 44 to tube 40 for producing a horizontal sweep of the cathode ray beam for the class A pattern. Numeral 66 denotes another saw-tooth generator controlled over lead 67 by the transmitter in device 39 and connected by lead 68 and switch 44 to tube 40 for obtaining a vertical sweep on the screen 61 of tube 40 for the class B indication. Reference numeral 69 denotes still another saw-tooth generator connected by lead 70 and switch 44 for obtaining a horizontal sweep for the class B indication. The timing or control circuit for the class B horizontal sweep generator 69 includes an insulator disk 71 mounted on the auxiliary shaft 73 and containing a conductive radial arm member 72, the shaft being driven by motor 31 through the 1 to 1 gear assembly 74. At one instant during one revolution of the motor 31, leads 75 and 76 in the control circuit are short-circuited through contact 77 and arm 72 whereby the sweep produced by generator 69 is synchronized with both the rotation of the phase shifters 8 and the sweep of the scanning antenna lobe, as will be more fully explained. Reference numeral 78 denotes a sectored disk comprising four small equal size sectoral insulators 79, large sectoral insulator 80 and radial conductive arms 81, 82, 83, 84 and 85. The disk 78 is mounted on, and driven by, shaft 73, and the radial arms are connected by lead 86 to battery 87. Reference numeral 88 denotes a contact for engaging arms 81 to 85 inclusive, in succession, the contact 88 being connected by the azimuthal indication control lead 89 through switch 44 to tube 40 when switch 44 is in the class B position. The insulators 79 are each 60 degrees wide and insulator 80 is 120 angular degrees wide, the arms 81, 82, 83, 84 and 85 being each about 2 degrees wide corresponding to one vertical trace of the cathode beam in tube 40. On screen 61 the azimuthal angle lines or vertical traces representing the −10 degrees, −5 degrees, 0 degrees, +5 degrees and +10 degrees azimuthal angles, correspond respectively to arms 82, 82, 83, 84 and 85 of disk device 78.

As illustrated in Fig. 1, each polyrod 7 is supported in an individual spring socket mounting 90 fitted into the front wall 91 of the antenna housing 92. The mountings are of the type disclosed in Patent 2,404,385 granted on July 23, 1946, to M. Fritts. The forty-two polyrods 7 extend horizontally from the front vertical wall. Also, as shown in Fig. 3 the housing 92 is ordinarily mounted at the top of a battleship mast or tower 93 above the optical range finder 94 and gun control director 95. Means (not shown) are provided for tilting or rotating the housing 92 about longitudinal axis 2 in the plane of the transverse array axis 3, as indicated by the curved double headed arrow 96, Fig. 1, and for rotating the housing in the azimuthal plane as indicated by the arrows 97, Figs. 1 and 3.

*Scanning operation*

Assuming for the moment that the antenna array has an exceedingly high gain and, in the horizontal scanning plane, an extremely narrow beam width, say 2 degrees, at the intersection of the beam and the scanned area or object, as is discussed fully below in connection with Figs. 7 to 11 inclusive, the scanning operation of the system will now be explained. The transmitter of device 39, Fig. 2, supplies to line 4 pulses of microwave energy having a mean wave-length of 9.80 centimeters, the pulsing rate being, for example, 1800 pulses per second. The pulses are supplied by line 4 to both halves of the auxiliary rectangular guide 21 in a manner such that vertically polarized components only are established in guide 21. The vertically polarized pulsed waves are then supplied to the auxiliary phase shifter 22, mid-points 19 and 20 of subarray lines 9 and 10, phase shifters 8, and finally to the fourteen tridents 6, the wavelets radiated being vertically polarized. In the diagrammatic illustration of Fig. 2, all of the turns or twists in the rectangular wave guide system necessary to preserve the vertical polarization, have been omitted for the sake of simplicity. Each trident has in the horizontal plane a blunt directive lobe with properly spaced nulls (Fig. 8), and the fourteen trident lobes are assumed to be superimposed so as to form a so-called "effective" trident lobe. The array 1 has, by virtue of the horizontal spacing H between tridents, a space factor characteristic which coalesces with the effective trident lobe to produce, disregarding for a moment the subordinate space factor lobes, a resultant or over-all principal transmitting lobe for the system. Motor 31 drives phase shifters 8 at 600 revolutions per minute and phase shifter 22 at 300 revolutions per minute as previously stated, whereby the primary space factor primary lobe traverses the effective trident maximum lobe and the principal resultant lobe sweeps, in one direction only, over the desired 30-degree scanning sector.

The receiving antenna action is the same as the transmitting antenna action, by virtue of the so-called reciprocity theorem; and the effective receiving maximum trident lobe, the receiving space factor primary lobe and the receiving resultant principal lobe are identical to the respective transmitting lobes. Pulses or waves impinging on objects such as boats, coastlines, etc., are reflected back to the antenna array 1 and are thence conveyed through the phase shifters 8 and 22 and associated guides to the receiver in device 39. Simultaneously with the emission of each radiated pulse, a reference pulse synchronized with the radiated pulse is supplied over lead 42, and through delay device 41 and closed switch 44 to the tube indicator 40. The received or echo pulse is delivered directly over lead 45 and through switch 44 to the tube 40. With switch 44 in the class B position, the incoming azimuthal angle or direction of the reflected pulses and one-half the time interval between emission and return of the pulses corresponding to the range of the reflective object or objects are ascertainable from the pattern obtained on the screen 61 of the cathode ray tube indicator 40. With the switch 44 in the class A position, the range only is indicated on the screen 61.

*Tandem phase shifter operation*

Assuming, Fig. 2, motor 31 is rotating, the phase shift $(2\varphi)$ introduced by each of the phase shifters 8 is twice that $(\varphi)$ introduced by shifter 22, since the rotors 11 of shifters 8 rotate at twice the speed of the rotor 11 of shifter 22. In Fig. 2 the amount and sense of the shift introduced by all phase shifters is indicated by the $+2\varphi$, $-2\varphi$ and $-\varphi$ characters adjacent the phase shifters, the phase shifts of opposite sense being obtained by properly orienting the polarizing and depolarizing sections of the phase shifters. Specifically, the rods in the polarizers and depolarizers of the retarding shifters are in space quadrature relative to the correspondent rods in the advancing phase shifters, the rods in all shifters being disposed at an angle of 45 degrees relative to the vertically polarized wave utilized. Considering mid-point 20, subarray B, as a reference point, the wave supplied to trident $B_0$ may be considered the "0" or reference phase wave since no phase shifter is included between point 20 and trident $B_0$. The wave supplied from point 20 and passing through phase shifter $D_4$ to trident $B_4$ has a relative phase of $+2\varphi$ inasmuch as the phase shifter is adjusted to advance the phase $2\varphi$. The waves passing through the advancing shifters $D_4$ and $D_5$ and arriving at trident $B_5$ have a relative phase of $+4\varphi$, and the wave passing through the advancing shifters $D_4$, $D_5$ and $D_6$ and arriving at trident $B_6$ have a phase of $+6\varphi$. Considering the left-hand half of subarray B, the waves arriving at tridents $B_1$, $B_2$, and $B_3$ have, respectively, the phases $(-2\varphi)$, $(-4\varphi)$, and $(-6\varphi)$, since each of phase shifters $D_1$, $D_2$ and $D_3$ is adjusted to retard the waves.

Phase shifter 22 is of the retarding type so that the wave at mid-point 19 has a $(-\varphi)$ phase relative to that at mid-point 20. Considering mid-point 19 of subarray guide 9 as a reference point, the relative phase distribution among the seven tridents of subarray A is the same as that in subarray B. The waves, however, in each of the seven tridents in subarray A are retarded $\varphi$ degrees relative to the waves in the corresponding tridents in subarray B, by reason of the presence of the phase shifter 22 in guide 21. Hence tridents $A_3$, $A_2$, $A_1$, $A_0$, $A_4$, $A_5$ and $A_6$ have a phase relation of $(-7\varphi)$, $(-5\varphi)$, $(-3\varphi)$, $(-\varphi)$, $(+\varphi)$, $(+3\varphi)$, and $(+5\varphi)$; and tridents $B_3$, $B_2$, $B_0$, $B_4$, $B_5$ and $B_6$ have a phase relation of $(-6\varphi)$, $(-4\varphi)$, $(-2\varphi)$, $(0)$, $(+2\varphi)$, and $(+6\varphi)$. In other words, the phase difference between the adjacent tridents in each of subarrays A and B is $2\varphi$ and, since all, except one, of the tridents of one subarray are interposed between the tridents of the other subarray, the phase difference between the adjacent tridents of the array 1, is $\varphi$. By virtue of the tandem phase shifter arrangement, a progressive difference of $2\varphi$, which difference varies continuously, is obtained in each subarray with the phase shifters 8 rotating at the same speed, and rapid scanning with the centimetric antenna is achieved. This tandem arrangement of applicant's antenna, it may be observed, has distinct electrical and mechanical advantages over the parallel phase shifter arrangement utilized in the short wave signal MUSAS disclosed in Patent 2,041,600 mentioned above, one embodiment of which is about two miles long, and disclosed in Patent 2,245,660 mentioned above. In the signal MUSAS the rotors of the several phase shifters are associated with gears of graded sizes and are rotated at speeds differing considerably from each other.

Figure 6:
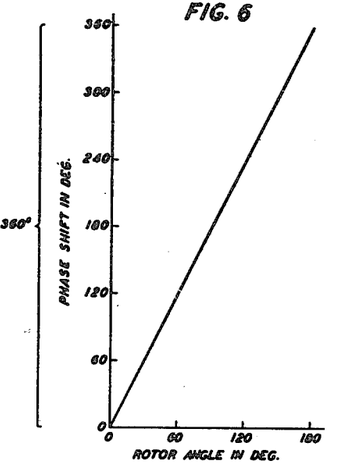
Fig. 6 is a curve useful for explaining the operation of the aforementioned system.

As shown in Fig. 6, one-half, that is, a 180-degree rotation of phase shifters 8 corresponds to a phase angle change of 360 degrees in the currents of the adjacent tridents in the array 1. The array parameters, namely, the length L, the number $n$ of tridents and the trident spacing H in the array 1 are such that the resultant principal antenna lobe moves over the desired 30-degree azimuthal sector once, right to left, during the period in which the trident phase difference $\varphi$ passes through all values included between 0 and 360 degrees of phase. Also, the lobe sweeps the 30-degree sector once for each complete rotation of the rotors 11 of phase shifter 8. One rotation of rotors 11 corresponds to 720 phase angle degrees since each of phase shifters 8 is connected between alternate tridents of the array, and the alternate tridents are spaced $2H=4\lambda$. It follows that the beam sweeps the sector once during every revolution of motor 31. With a rotation of 600 revolutions per minute for motor 31 and for the rotors 11 of phase shifters 8, the lobe moves across the 30-degree sector, always in the same direction, at the rate of ten times per second. The speed of motor 31 is not necessarily critical and it may be decreased for slower scanning and increased for more rapid scanning.

*Class B operation*

Figure 4:
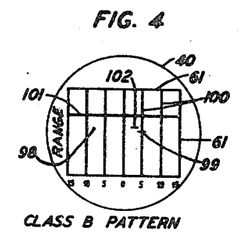
Figs. 4 and 5 are cathode ray tube patterns obtained with the system of Figs. 1 and 2.

Referring to Figs. 2 and 4, with switch 44 in the class B position and cathode ray tube 40 energized, a fine cathode beam is projected by cathode 53 on screen 61. The saw-tooth generator 69 connected between vertical plates 59 and 60 causes the cathode beam to sweep horizontally across screen 61. Timing of the above-mentioned cathode ray sweep is controlled by the rotating arm 72 in a manner such that the cathode beam is synchronized with the sweep of the antenna resultant principal lobe across the 30-degree scanning sector. Also, one sweep of the cathode beam occurs for each revolution of motor 31. Simultaneously therewith, the saw-tooth generator 66 connected between the horizontal plates 57 and 58 causes the beam to sweep vertically, the sweep being timed or controlled over lead 67 by the pulses generated in the transmitter portion of device 39. Hence, coincidently with the emission of each pulse, the cathode beam starts to move vertically upwards, the time interval for the complete up and down excursion of the beam being equal to the time interval between pulses. The down sweep is preferably blanked out. The echo or received pulse is supplied over echo lead 45 through switch 44 to the anode 55 and causes a momentary increase in the intensity of the moving cathode beam. Thus, a single echo pulse appears on the screen 61 as a dot 98, Fig. 4, and the successively received pulses reflected by an object appear as a luminous horizontal line 99 having a length as explained below of approximately 2 degrees. Actually, the line is composed of about twelve closely associated dots each representing an echo pulse and each having its locus on a separate up trace of the beam.

Inasmuch as the pulsing rate is 1,800 pulses per second and the cathode beam sweeps horizontally ten times per second in synchronism with the rapidly scanning antenna lobe, there are 180 vertical sweeps or traces for each scanning frame corresponding to a 30-degree territorial sector. In other words, there are thirty lines for each 5-degree zone and a total of 1,800 vertical scanning lines per second. As the antenna lobe progresses from left to right over the territorial sector and as disc 78 rotates, battery 87 is connected over line 89 momentarily to the grid 54, whereby during the entire particular up sweeps occurring at the +10 degree, +5 degree, 0 degree, −5 degree, and −10 degree positions of both the antenna lobe and of the cathode beam, the intensity of the cathode beam is slightly increased and azimuthal indication lines 100 are caused to appear on the screen 61. More particularly, since a 180-degree rotation in each of the phase shifters 8 corresponds to a phase change of $\varphi = 360$ degrees for the adjacent trident currents, and, therefore, corresponds to one sweep of the beam over the azimuthal scanning angle of 30 degrees, each degree change in the antenna directivity corresponds to a 12-degree change in the phasing of the currents in the adjacent tridents and a 12-degree rotation of disc 78. Hence, a 5-degree change in the antenna directivity corresponds to a 60-degree phase change and to a 60-degree rotation of disc 78. If arm 83 is related to the 0-degree azimuthal direction coinciding with the transverse array axis 3, the arms 82 and 84 representing, respectively, the +5 degree and the −5 degree directions must extend at 60 degrees to arm 83; and the arms 81 and 85 representing the +10 degree and the −10 degree directions must extend at 60 degrees to arms 82 and 84, respectively. The 120-degree angle between arms 81 and 85 of disc 78 corresponds to the angular distance between the +10 degree direction and the −10 degree direction, as measured through the ±15 degree direction.

Simultaneously, with the delivery of each pulse by device 39 to line 4, a reference pulse is supplied over lead 42 to the delay device 41 and thence over branch reference lead 46 and switch 44 to grid 54 of tube 40, whereby at a point in each up sweep of the cathode beam, the beam intensity is slightly increased and a range measuring line 101, Fig. 4, is produced. The horizontal luminous range line 101 is movable under control of handle 49 and its position may be accurately determined from counter 52. Thus, distinctive calibrations, as to azimuthal angle and range, are applied directly to the cathode beam and trace during each frame of the pattern established on screen 61, and preferably the screen 61 is not permanently calibrated since such calibrations are often unreliable. Referring to Fig. 4, and assuming reference numerals 99 and 102 denote pulse indications representing reflective objects, the range or distance of each object, and the difference in their ranges, may be accurately determined by manipulating handle 49 and moving line 101. The azimuthal angle of both reflective objects may be roughly determined by observation of the azimuthal angle line 100 on screen 61. For more accurate determination of the direction of either object, the housing 92 and array 1, Fig. 1, may be rotated as indicated by arrow 97, Fig. 1, for the purpose of shifting the 30-degree scanning zone, until the 0 angle line 100 coincides with the center point of the horizontal line representation 99 or 102. If desired, the rotatable shaft 93 (Figs. 1 and 3) supporting the housing 92, and the shaft 50 (Fig. 2) associated with the counter 52 may each be connected through a separate gear assembly 103 to separate voltage-producing arrangements each comprising a servo-motor, a voltage source and a potentiometer, whereby distinct voltages representing the range and azimuthal direction may be obtained for controlling an electrical or mechanical computer-predictor system in the gun director.

*Class A operation*

Figure 5:
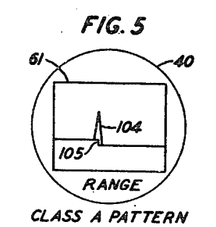

Referring to Figs. 2 and 5, with switch 44 in the class A position, accurate "searching" may be accomplished. The pulse transmitting and receiving operations are the same as described above for the class B, except that the indication, Fig. 5, obtained on screen 61 represents only the range. Also, the motor 31 rotates one revolution per minute and the antenna lobe is, therefore, caused to sweep across the 30-degree sector very slowly, that is, once per minute. The saw-tooth generator 63, which is controlled by the transmitted pulses generated in device 39 and is connected through switch 44 between vertical plates 59 and 60 of tube 40, produces a horizontal sweep, one sweep for each transmitted pulse. The received or echo pulse is supplied by the receiver through switch 44 to the horizontal plates 57 and 58 of tube 40 and causes the cathode beam to deflect vertically and in a manner such as to produce a momentary luminous peak 104 at a point in its horizontal sweep related to the interval between the emission and return of the pulse, and related therefore to the range of the reflected object. A reference pulse is supplied over lead 42 to the delay circuit 41 simultaneously with the emission of the transmitted pulse and, after passing through the delay device 41, the reference pulse is passed to the stepping device 43 which includes means for applying through switch 44 a biasing potential across horizontal plates 57 and 58 during the remaining portion of the cathode beam horizontal sweep, with the result that a step or break 105, Fig. 5, is obtained in the horizontal beam trace. By manipulating counter-handle 49, the step 105 may be moved horizontally so as to coincide with the center of the peak 104, and the range may be ascertained from the counter reading. In the class A operation, an echo pulse representing a target possesses a vertical or height dimension perpendicular to the normal horizontal trace and the target indication is therefore easily distinguished from spurious reflections, whereas, in the class B indication, the echo pulse is characterized primarily only by a dot or a short horizontal line and the target reflection is not so readily discerned. Hence the class A indication is sometimes preferred for roughly determining the range, but not the direction, of a target and the class B indication is utilized when both range and direction determinations are desired.

Antenna characteristics and operation

Figure 7:
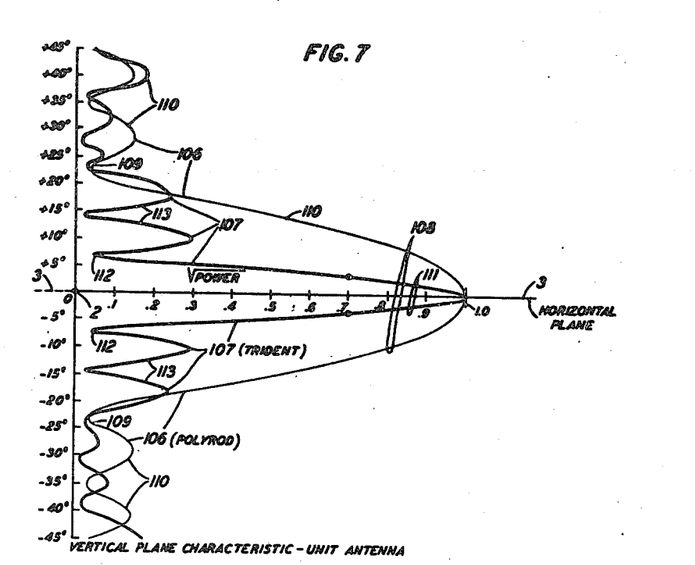
Fig. 7 illustrates the transverse vertical plane directive characteristics, and Figs. 8, 9 and 10, the horizontal plane directive characteristics of the antenna used in the system of Figs. 1 and 2.

First of all, since the transverse electric (TE) or $H_{11}$ wave utilized in the system is polarized vertically throughout the rectangular wave guide system and in the circular polyrods 7, the directive characteristic in the vertical plane containing axis 3 corresponds to the electric plane directive characteristic; and the horizontal plane directional characteristic is the same as the magnetic plane directive characteristic. Referring to Fig. 7, which illustrates the directive characteristic in the vertical plane containing the transverse axis 3 and perpendicular to the longitudinal axis 2 of the steerable antenna, reference numeral 106 denotes the measured directive characteristic of a single polyrod element 7, seven and a quarter wave-lengths (28 inches) long and numeral 107 designates the measured vertical plane characteristic of the trident 6 comprising three polyrods 7. These curves are in a sense "free space" characteristics since they represent the radio actions of the polyrod and trident, each taken alone, that is, apart from the adjacent tridents in the array. In this plane, however, the free space characteristic is not substantially different from the actual characteristic. The polyrod characteristic 106 includes the maximum lobe 108, the nulls 109 adjacent thereto and the minor lobes 110; and the trident characteristic 107 includes the maximum lobe 111, the nulls 112 adjacent thereto and the minor lobes 113. While the trident maximum lobe 111 is to some extent fan shaped, the tilt of the housing is ordinarily adjusted, as previously explained, so as to maintain the trident lobe substantially horizontal for continuous azimuthal scanning. The trident 6 is more directive than the polyrod 7 and has a higher gain, the increase in gain being the primary reason for utilizing in the unit antenna three polyrods instead of one. Thus, the gain of the single polyrod 7 over a non-directional microwave reference antenna is about 16.4 decibels and the gain of the trident 6 is about 4.8 decibels greater than that of the polyrod 7, the gain of a single polyrod being roughly equal to that of a paraboloidal reflector having a diameter of three wave-lengths and to that of an optimum design rectangular horn 2.5 wave-lengths by 3.0 wave-lengths. The absolute gain of the entire array 1 is about 29 decibels. By virtue of the high gain of the trident and the array, the operating or scanning range is relatively high.

Figure 8:
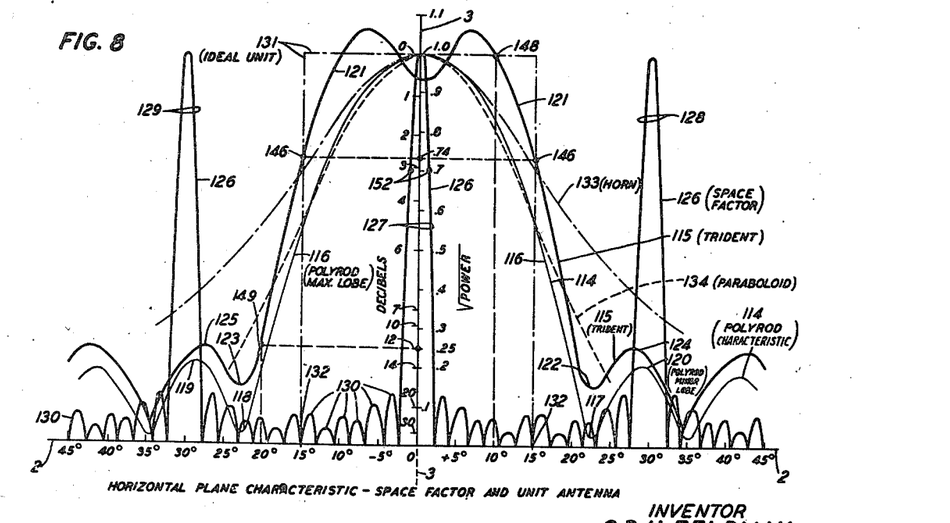
Figure 9:
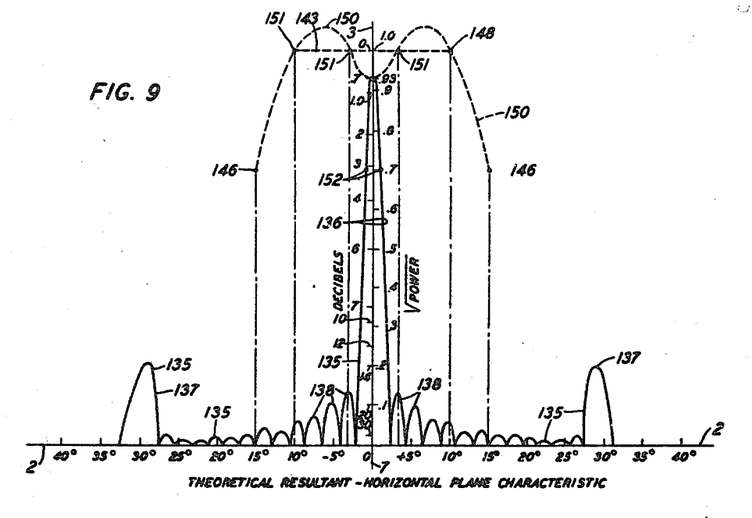

Considering the horizontal plane containing the transverse array axis 3 and the longitudinal array axis 2, Fig. 8 illustrates the directive characteristic for the trident 6 and the space factor directive characteristic for the array 1. Fig. 9 illustrates the theoretical, and Fig. 10 the measured, resultant or over-all directive characteristic for the system of Figs. 1, 2 and 3. Referring to Fig. 8, reference numeral 114 denotes the measured horizontal characteristic of the trident taken alone, as in free space, which characteristic is substantially identical to that of the polyrod taken alone or in free space, and numeral 115 designates the actual characteristic of the trident 6 obtained with the trident as installed in the array 1. The free space trident characteristic 114 includes the maximum unit lobe 116, the two nulls 117 and 118 adjacent to lobe 116 and positioned at the —22.5 degree and +22.5 degree azimuthal directions, and the adjacent minor lobes 119 and 120. The actual trident characteristic 115 includes the maximum lobe 121 having a central dip or depression, the effective nulls 122, 123 and the minor lobes 124 and 125. The space factor characteristic 126 for the fourteen tridents includes the primary major lobe 127, the secondary major lobes 128 and 129 and the subordinate lobes 130. Numeral 131 designates a unit antenna maximum lobe or characteristic which is the ideal or optimum lobe for use with the space factor or array characteristic 126, the ideal characteristic having the complete nulls 132, but no minor lobes. The dash line curve denoted by numeral 133 illustrates the theoretical or calculated maximum lobe of the characteristic for a conventional rectangular microwave horn, two wave-lengths square; and the dash line curve 134 illustrates the maximum lobe of the theoretical characteristic for a conventional paraboloidal antenna having a diameter of two wave-lengths. Curve 133 was obtained by extrapolation from a curve for a horn 2.4 by 2.9 wave-lengths, and curve 134 was obtained by extrapolation from a curve for a paraboloidal reflector having a diameter of three wave-lengths. Curves 133 and 134 for the horn and paraboloidal reflector are not related to apparatus used in the system of Figs. 1, 2 and 3, but are included in Fig. 8 merely for the purpose of illustrating, by way of comparison with conventional microwave antenna units, the directive actions in the horizontal plane of polyrod 6 and trident 7.

As shown in Fig. 8, the spacing between the primary space factor lobe 127 and each of the secondary space factor lobes 128 and 129 is 30 degrees, the same as the predetermined desired scanning sector, and is directly related to the physical spacing H between the tridents. Considering the actual characteristic 115 of the trident 6, each of the angular spacings between the axis 3 of the effective maximum trident lobe 121 and the adjacent minor trident lobes 124 and 125 roughly equals 30 degrees and therefore is comparable to the spacing between the primary and secondary space factor lobes. The angular spacing between the two trident nulls 122 and 123 is less than the spacing between secondary space factor lobes 128 and 129, each null being included between the array or space factor primary lobe 127 and one of the space factor secondary lobes 128 and 129. It will be noted that the intensity, represented by the vertical scale on the drawing, of the space factor subordinate lobes 130 is substantially negligible, the effect being secured, as previously explained, by reason of the stile-like distribution of the trident currents. Also, as discussed below, the "actual" trident characteristic 115 is superior to the "free space" trident characteristic 114 and their difference in shape is a result, it is believed, of the mutual coupling between each trident and the tridents or trident immediately adjacent thereto.

Figure 10:
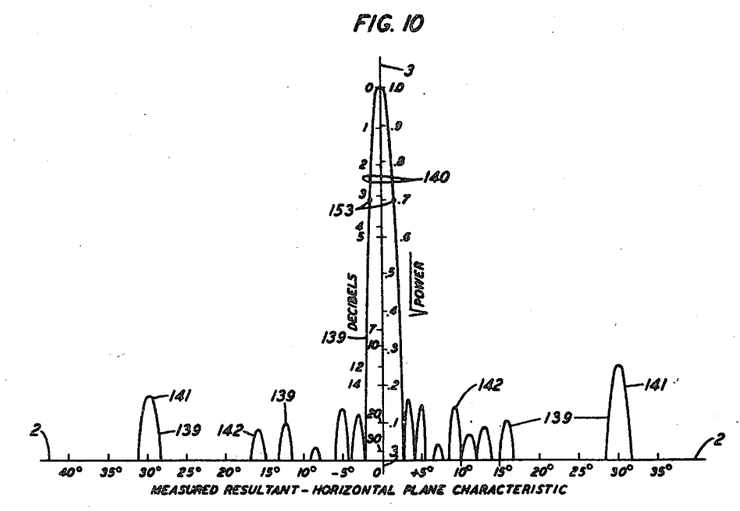

Referring to Fig. 9, reference numeral 135 denotes the resultant over-all characteristic for the system with the trident phasing adjusted for the 0-angle position. The resultant was obtained by multiplying the ordinates or intensities for the various azimuthal directions (Fig. 8) of the actual trident characteristic 115 and the space factor characteristic 126. Reference numeral 136 denotes the principal resultant lobe; numerals 137 designate the subsidiary resultant lobes, and numerals 138 the negligible or minimum resultant lobes. In Fig. 10, reference numeral 139 denotes the measured characteristic corresponding to the theoretical characteristic 135 of Fig. 9 and obtained in a system similar to the system of Figs. 1, 2 and 3. Reference numeral 140 designates the measured principal lobe of the space factor characteristic 139, reference numerals 141 the measured subsidiary lobes and numeral 142 the negligible minimum lobes.

In operation, the entire space factor characteristic 126, Fig. 8, moves right to left, the position of the characteristic for the 0-angle direction being illustrated on Fig. 8. Considering the horizontal plane operation and assuming, for the purpose of explanation, the use of the ideal lobe 131, Fig. 8, when the space factor characteristic moves right to left and the primary lobe 127 moves off the 0-angle position towards the —15 degree direction, the secondary lobe 128 approaches the null 132 and the ideal lobe 131. As the primary lobe 127 moves through the —15 degree position and off the ideal lobe 131, the secondary lobe 128 moves through the +15 degree position and onto the ideal lobe 131. Since, at any given instant, only one space factor lobe intersects the ideal lobe, completely unambiguous scanning over the desired 30-degree range would be secured in this hypothetical system. Also, since the ideal lobe 131 is rectangular in shape, as shown in Fig. 8, and is, therefore, exactly sectoral in polar coordinates, the product of the space factor and ideal antenna unit characteristic would be constant during the 30-degree sweep, as indicated by the horizontal line 143 in Fig. 9, whereby the same antenna action is obtained as the moving beam successively includes all of the directions in the 30-degree sector. Stated differently, in the case of reception, the array comprising ideal antenna units successively and equally accepts, or responds to, all wave directions included in the 30-degree sector while discriminating against and rejecting completely waves having directions outside the sector.

While the ideal characteristic 131 is as a practical matter unobtainable, the unit antenna utilized in accordance with the invention in the system of Figs. 1 and 3 has a characteristic which approaches or approximates the ideal characteristic. Thus, referring to Fig. 8 and considering the actual trident characteristic 115, with the primary space factor lobe 127 at the 0-angle, the secondary space factor lobes 128 and 129 intersect the minor trident lobes 123 and 124, respectively, with the result that the subsidiary lobes 137, Fig. 9, of the resultant characteristic are sufficiently down, about 0.2 on the square root power scale, to be negligible as compared to the principal resultant lobe 136 which has a unity value on the square root power scale. As the primary space factor lobe 127, Fig. 8, moves to the left, the secondary space factor lobe 128 approaches, as in the case of the ideal lobe condition, the effective trident null 122 at the +22.5 degree position. As the secondary space factor lobe 128 reaches the null 122, the primary lobe 127 becomes aligned with the —7.5 degree position; and as the primary lobe 127 reaches the null 123, the secondary lobe 128, which is about to become the primary lobe, reaches the +7.5 degree position. In other words, lobe 128 advances or climbs up the maximum trident lobe 116, and becomes superimposed on the portion of lobe 116 included between the +22.5 degree and +15 degree directions, before lobe 127 reaches the —15 degree position, and therefore before it leaves trident lobe 116. Hence, the scanning is completely unambiguous in the central zone or portion of the 30-degree sector extending +15 to —15 degrees, the central zone being a 15 degrees wide and extending from +7. —7.5 degrees. It is not, however, compl unambiguous in the two end zones exter from +15 to +10 degrees and from —10 to degrees. The ambiguity in the end zones i excessive since the secondary lobe 128 trav a low power portion, while the primary lob traverses a high power portion, of the tr lobe 116. As explained below in connection Fig. 11, in practice, the scanning is substan unambiguous from the +10 to the —10 d positions.

Figure 11:
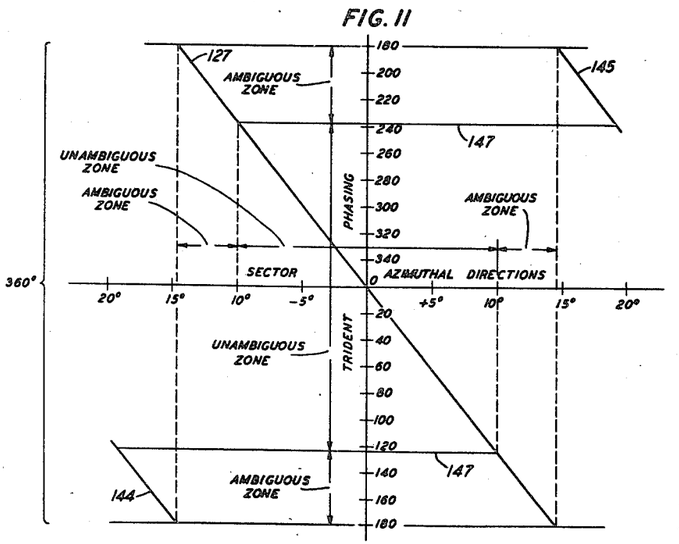
Fig. 11 is a curve showing the unambiguous and slightly ambiguous scanning zones in the azimuthal plane for the system of Figs. 1 and 2.

Referring to Fig. 11, the unambiguous and biguous zones are shown more accurately; an relation of these zones to the cyclical vari in the phasing of the adjacent trident curre illustrated. First of all it should be pointe that, while heretofore the spacing between primary space factor lobe 127 and the secor lobe 128 or 129 has been considered to be 3 grees, corresponding to the desired 30-d scanning sector, the space factor lobe spaci subject to a slight variation during the swe rotation of the space factor characteristic This follows from the facts that the rotation 1 tioned above is produced by changing the ph of the trident currents; and the lobe spaci a function of the trident phasing. Thus, 1 retically, for the condition of zero phase d ence for the trident currents, the primary 127 is at the broadside or zero degree pos and the lobe spacing is 30 degrees. As the p ing changes, and therefore as lobe 127 de from, and lobe 128 approaches, the zero d direction, the lobe spacing decreases. Whe a result of the change in the trident pha lobes 127 and 128 assume directions making angles with the zero degree direction, a nu subordinate lobe 130 being aligned with the direction, the spacing is slightly less than 3 grees as, for example, 29 degrees. Hence, fo 180-degree phasing condition, Fig. 11, the sp between the two equal space factor lobes 144 145, which correspond to lobes 127 and 128 symmetrically disposed to the zero degree d tion, is 29 degrees. In other words, the spacing equals the angular separation bet the +14.5 and —14.5 degree directions. Th equal space factor lobes just described inte the trident maximum lobe 116 at points 146, 8 and 9, which points are at the 0.74 square power point corresponding to 5.2 decibels for the round trip value. Obviously, the 18 gree phase shifter setting is ambiguous. As ing the useful scanning is restricted to the ce sector included between +10 degrees and degrees, as indicated by the horizontal lines Fig. 11, with the primary space factor lobe at the +10 degree direction, and therefore a 1.0 or unity power point 148 on trident lobe Figs. 8 and 9, the secondary space factor lob is at the —20 degree position, and therefo the 0.25 square root power point 149. Si differently, for the one way trip of the em waves, the lobe 129 intersects trident lobe at a point 149 which is 12.0 decibels down rel to the point 148 at which lobe 127 intersects dent lobe 116. For the round trip the differ is 24.0 decibels. The 24.0 decibel round trip ferential provides an unambiguous 20-d azimuthal sector which is satisfactory for u connection with the operation of a main ba direction on a warship to control gunfire a enemy battle line. As shown in Fig. 11, unambiguous action is obtained when the phasing changes from zero degrees to 130 degrees and 230 degrees to 360 degrees, approximately, and somewhat ambiguous patterns are obtained when the phase difference is between 130 degrees and 230 degrees.

In addition, the actual trident lobe 116, Fig. 8, is fairly blunt, and in this respect compares favorably with the ideal lobe 131. Hence the variation in the antenna response, Fig. 9, is relatively small over the 29–30 degree scanning zone and highly satisfactory operation over this zone is obtained. Curve 150, Fig. 9, illustrates the theoretical variation in the intensity of the resultant principal lobe 136 over the 29–30 degree scanning sector. As shown by this curve, at the +10 degree, +3.5 degree, −3.5 degree and −10 degree directions, the lobe intensities denoted by numeral 148 and numerals 151 are equal and have a unity value, and the maximum variation between curves 143 and 150 occurs at the zero direction. At the zero degree direction, the trident lobe 116 has a square root power value of 0.93 and is therefore only 0.7 decibel down relative to the ideal lobe 131 which of course has a unity square root power value at this direction.

Considering lobe 127, Fig. 8 and lobe 136, Fig. 9, the parameters of the array 1, particularly the array length, the trident spacing and the stile-like amplitude distribution, are such that the width of the primary space factor lobe 127 and therefore the width of the principal resultant lobe 136 are exceedingly narrow, that is, only 2 degrees at the "half power point" 152 corresponding to the 0.7 square root value in Fig. 9. The "half power" point is referred to since, in operation, the amplification in the receiver is preferably adjusted so that this lobe point or, more accurately, the cross-sectional lobal area of resultant lobe 136 at this point, intersects the scanned area or object, whereby a high degree of resolution is realized in the pictorial representation of the scanned territory on the cathode tube, as will be explained in connection with Figs. 12 and 13. While the critical width at point 152 varies with the change in the phasing φ, the variation during the lobe sweep over the 30-degree scanning sector is very slight and may be considered negligible. It should be noted that the measured resultant characteristic 139, Fig. 10, is in substantial agreement with the theoretical resultant characteristic 135, Fig. 9, the measured subsidiary lobes 141 being very small and the effective scanning width, at the half power point 153, of the measured principal lobe 140 being 2 degrees.

Figure 12:
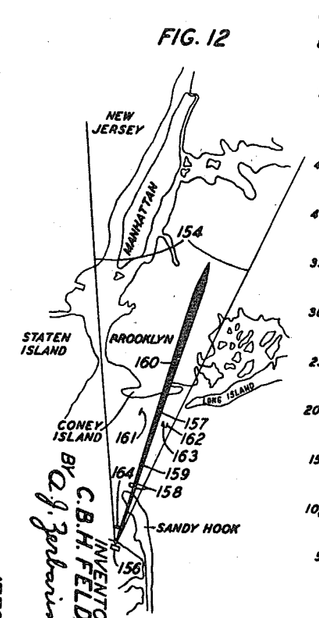
Fig. 12 illustrates a scanned azimuthal sector.
Figure 13:
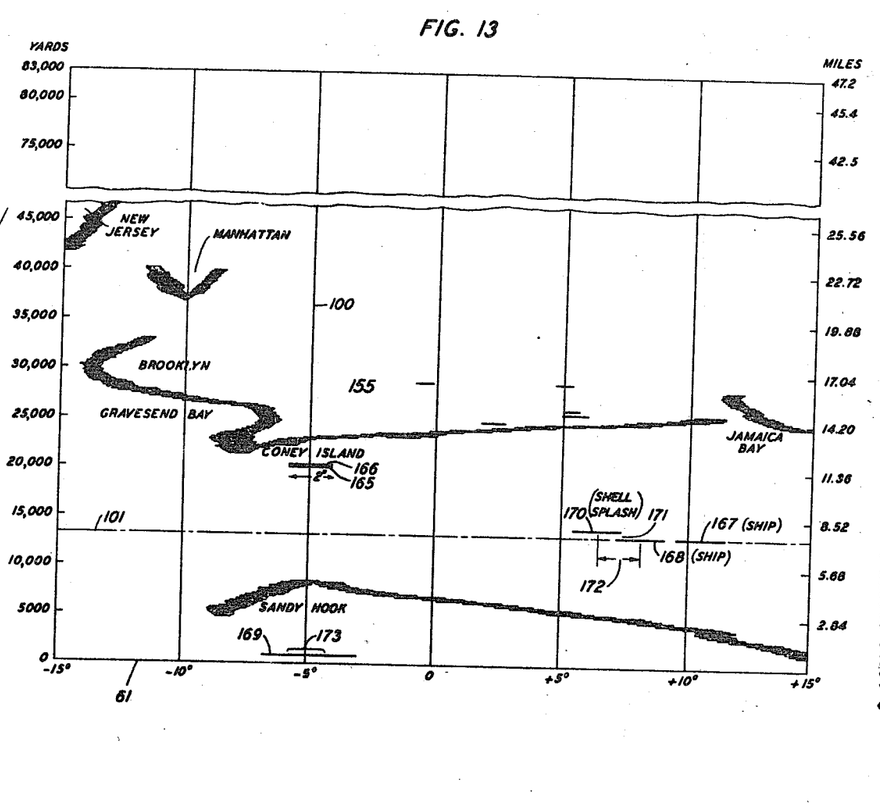
Fig. 13 illustrates a typical pictorial view for the scanned sector of Fig. 12.

In one actual test of a scanning system constructed in accordance with the invention and illustrated by Figs. 1 and 2, the 30-degree territorial sector 154, Fig. 12, including the lower Hudson River, lower Manhattan, Brooklyn, a portion of northern New Jersey, and lower New York Bay, was viewed or scanned from Atlantic Highlands, New Jersey, about twenty miles from Manhattan. Numeral 155, Fig. 13, illustrates in general and except for certain details, a cathode tube class B pattern obtained in viewing the sector 154. While, in general, the pattern for a given sector, such as sector 154, is fairly stabilized during a given scanning period, it changes more or less continuously because of the presence of moving objects and because of other factors. While pattern 155 does not purport to be an exact reproduction or photograph of an actual pattern, it may be considered to be a typical pattern for sector 154. For purpose of explanation it is assumed that the receiver gain at the scanner 156 was adjusted so that ships at 15,000 to 20,000 yards range gave indications of about 2 degrees wide on the screen 61, the half power lobe point 157 of the scanning lobe 158 being at the location shown in Fig. 12, approximately. If the receiver amplification had been smaller, the half power point 157 would have been closer to the scanner 156 as, for example, at point 159; and if it had been larger, it would have been farther away from scanner 156, say at point 160. In Fig. 12 reference numeral 161 designates a ship pointed toward the scanning location so as to align with the lobe axis during the lobe sweep. Numerals 162 and 163 designate two other ships positioned broadside to the antenna beam and at the same long distance or range from the scanner 156, and reference numeral 164 denotes a long ship positioned broadside to the beam but relatively close to the scanning location. As shown in Fig. 13 a pictorial view of the entire 30-degree sector 154 appears on the screen; and this effect is secured in part by properly relating the scanning rate, ten sweeps per second, to the persistency or fading characteristic of the material comprising cathode tube screen 61.

Referring to Fig. 13, it will be seen that the pictorial class B pattern 155 produced on screen 61, and representing the 30-degree territorial sector 154, is exceedingly accurate. Thus, the pattern gives both the distances and bearings of the New Jersey, Manhattan, Brooklyn and Sandy Hook shore lines and of the ships 161, 162 and 163 in New York Bay. Assuming the width of the vessel is much less than that of the antenna lobe 158 traversing the vessel and that the vessel is not too close to, or too far from, the scanner 156, the various ships produced, in practice, lines or patterns on the tube having a 2-degree width, substantially, the line widths being equal to the effective lobe width at the point of intersection of the lobe and the vessel plus the width of the vessel. Numerals 165 and 166 denote lines or traces representing the fore and aft mast portions of vessel 161, and lines 167, 168 and 169 denote the vessels 162, 163 and 164, respectively. By reason of the use of an exceedingly narrow beam of 2 degrees, in accordance with the invention, the vessels 162 and 163 appear as separate lines 167 and 168 on the screen. If the beam were wider, as in conventional prior art systems, these objects would not be separately reproduced since they are at the same distance from the scanner. For the purpose of explaining one important result secured by the invention, the trace 170 which would be produced by a splash from a spot shell fired at, and exploding near, vessel 168 is represented in pattern 155. In practice, the error 171 in range and the error 172 in azimuthal direction for the shell path are determined for the purpose of correcting the electrical computer in the gun director. If the target ship 162 is moving, the rate of change in range and the rate of change in bearing may be ascertained from the class B pattern. In the case of the nearby ship 164, the width of the ship is greater than the 2 degree lobe width 173 so that the lobe scans, in succession, adjacent exposed surfaces of the ship. Consequently, the width of the trace 169 of the ship 164 is greater than two degrees, independent of the lobe width and accurately representative of the size of the vessel, whereby a radio vision effect is secured.

Thus, in accordance with the invention, and by reason of the use of a highly directive antenna system which has an extremely narrow principal lobe at the half power point, a high degree of directive resolution and unambiguous operation are obtained in the scanning system. By utilizing a screen 61 composed of material having a short persistence quality, and by rapidly scanning with a narrow lobe at a rate properly related to the fading or persistency characteristic of the material composing screen 61, the resolution in azimuth and range is greatly enhanced and precise splash spotting is accomplished. The enhancement is due to inherently better detail with the short persistence screen and also because smudging of the pattern is avoided when either the echo pulse indication, or the range and direction linear markers, are moved. In addition, enemy jamming and friendly interference are reduced by reason of the narrow lobe and the short persistence of the screen.

Although the invention has been explained in connection with a specific embodiment, it is not to be limited to the particular embodiment described, inasmuch as other apparatus may be satisfactorily employed in practicing the invention. Also, if desired, the wave components utilized may be polarized in the horizontal plane. Again, while the invention has been explained as applied to a scanning system, it may be utilized for determining the direction of incoming waves originating at distant stations and may be employed in other types of direction finding or indication systems.

What is claimed is:

1. A highly directive centimetric antenna array comprising a plurality of linear antenna subarrays arranged in broadside, each subarray comprising a plurality of antenna elements arranged in broadside, and each element comprising an end-on dielectric rod.

2. A linear antenna array comprising a plurality of directional antenna units uniformly spaced a predetermined distance and connected to a translation device, said array having a space factor or array characteristic including major lobes angularly spaced an amount dependent upon said distance and each unit having a directional lobe, the ratio of radio actions of each unit in two directions included in its directional lobe and angularly spaced an amount substantially equal to one half of the angular spacing between adjacent space factor major lobes being greater than one-half.

3. An antenna array for obtaining maximum unidirectional action along a direction included in a given angular sector, said array comprising a plurality of unidirective antenna elements connected to a translation device and uniformly spaced a distance related to the angular width of said sector, each element having a maximum directive lobe and said array having a space factor characteristic including major lobes angularly spaced an amount related to said distance, the angular width in a given plane of the maximum lobe of each element being greater than the angular spacing between adjacent space factor major lobes of the array and less than the angular spacing between alternate space factor major lobes.

4. A microwave scanning multiunit system comprising a plurality of dielectric rod end-on antenna units, a translation device, a dielectric channel connecting each unit to said translation device, the electrical lengths of the dielectric paths connecting said units to said translation device having substantially equal delays.

5. A system in accordance with claim 4, all paths, except one, including at least one wave guide adjustable phase shifter, and means at each end of each phase shifter for eliminating reflection losses substantially.

6. A linear antenna array comprising a plurality of directive antenna elements connected to a translation device and spaced approximately two wavelengths aparts, said array having in a given plane a space factor or array characteristic including major lobes spaced approximately thirty degrees, said elements each having in said plane a characteristic including a maximum lobe, said maximum lobes being similarly oriented and in effect superimposed and the greatest angular width of each maximum lobe being greater than thirty and less than sixty degrees.

7. An array in accordance with claim 6, and means for moving the array characteristic relative to the maximum lobe of each element.

8. An antenna array comprising a plurality of unidirective dielectric end-on antenna elements spaced a predetermined amount and connected to a translation device, said array having a space factor or array directive characteristic comprising major lobes having an angular spacing depending upon said predetermined spacing between the antenna elements, said antenna elements each having a directive characteristic including a maximum lobe and a minor lobe on each side of said maximum lobe, the angular spacing between the principal axes of alternate array lobes being substantially equal to the angular spacing between the principal axes of said minor lobes.

9. An array in accordance with claim 8, the directive characteristic of each element including a null between the maximum lobe and each minor lobe, and means for moving the array characteristic relative to the characteristic of each element, whereby when one major array lobe moves in either direction away from the principal axis of the maximum unit lobe and one of the adjacent major lobes moves toward said maximum lobe, said adjacent lobe approaches one of said nulls, and unambiguous radio action occurs.

10. A microwave scanning multiunit steerable antenna system comprising a translation device and at least four antenna elements arranged in broadside, three wave guide phase shifters each having a phase varying rotor, one element being directly connected to said device, the element adjacent thereto being connected to said device through a first phase shifter, the element adjacent to the last-mentioned element being connected to said device through a second phase shifter, and the remaining element being connected to said device through a third phase shifter and the first phase shifter, means for continuously rotating the rotor of the first shifter at a given velocity and the rotors of the remaining two phase shifters at twice said velocity, whereby the phase differences between the currents in adjacent elements are equal.

11. A highly directive microwave broadside array comprising a plurality of spaced antenna units, one set of alternate units constituting one subarray and the other set comprising another subarray, a plurality of phase shifters, a pair of branch transmission channels one for each subarray, each antenna unit being connected through at least one phase shifter to its branch channel, an auxiliary channel including a phase shifter connecting the mid-points of said branch channels, a main channel connected to the mid-point of said auxiliary channel, and a translation device connected to said main channel.

12. A microwave scanning multiunit steerable antenna comprising three antenna units or elements arranged in broadside, a pair of wave guide phase changers each having a rotatable phase varying section and a linear stationary polarizing member, a transceiver, the central unit being directly connected and the remaining units being each connected through a different phase changer to said translation device, and means for continuously rotating said sections at the same speed and in the same direction, the polarizing members being positioned in spaced quadrature, whereby the phases of the waves supplied to or received from said remaining elements are continuously and oppositely changed and the phase of the waves supplied to or received from the central element remains constant.

13. A multiunit steerable antenna system comprising a transceiver, a main channel connected thereto, an auxiliary variable phase shifter, at least two subarrays, each subarray comprising a branch channel, a plurality of antenna units connected to spaced points on said branch channel, a plurality of variable main phase shifters each connected to said branch channel between different pairs of said units, the branch channel for one subarray being connected directly and the branch channel for the other subarray being connected through said auxiliary phase shifter to said main channel, and means for continuously and equally varying said phase shifters at a given rate and for continuously varying said auxiliary phase shifter at one-half said rate.

14. A scanning multiunit steerable antenna system comprising a transceiver, a plurality of spaced antenna units, a transmission channel, a plurality of phase changers spaced along said channel and connected in tandem, one of said units being connected through all of said phase changers to said transmission channel and another of said units being connected directly to said transmission channel, the remaining units being connected to said channel each at a point between different pairs of adjacent phase changers, and means for equally and continuously varying said phase changers, whereby each unit is connected to said transmission channel through a different number of phase changers and the phase distribution of the waves supplied to and received from said units is progressively varied.

15. A centimetric multiple unit steerable antenna system for scanning an approximate thirty degree sector, said system comprising a broadside array of fourteen antenna units connected to a translation device, said units being spaced approximately two wavelengths apart, whereby the angular spacing between the major lobes of the array space factor directive characteristic is the same as the angular width of the sector and the half power width of the principal resultant lobe for the entire system is approximately two degrees.

16. A centimetric multiple unit antenna system for scanning a thirty degree sector, said system comprising a broadside array of fourteen end-on antenna units spaced approximately two wavelengths apart and each comprising a tapered dielectric antenna rod at least seven wavelengths long, a pair of wave guides each connecting seven antenna units to a translation device, said array having a space factor primary lobe and said antenna units having superimposed similarly shaped maximum lobes each having a maximum width greater than thirty degrees, phase shifting means included in said guides for moving said primary lobe over said superimposed maximum lobes and obtaining a movable principal resultant lobe, the ratio of the minimum to the maximum intensity of the thirty degree central portion of each maximum lobe aligned with the thirty degree sector being greater than one half, whereby the intensity of the principal resultant lobe varies only a relatively small amount as the primary lobe moves over the aforementioned thirty degree central lobe portion and as the resultant lobe moves over the thirty degree sector.

CARL B. H. FELDMAN.

REFERENCES CITED

The following references are of record in the file of this patent:

UNITED STATES PATENTS

| Number | Name | Date |
| --- | --- | --- |
| 2,245,660 | Feldman et al. | June 17, 1941 |
| 2,227,598 | Lyman et al. | Jan. 7, 1941 |
| 2,206,923 | Southworth | July 9, 1940 |